Feb. 15, 1927.
S. RYBÁR
1,617,823
EOTVOS' TORSION BALANCE
Original Filed Dec. 5, 1924
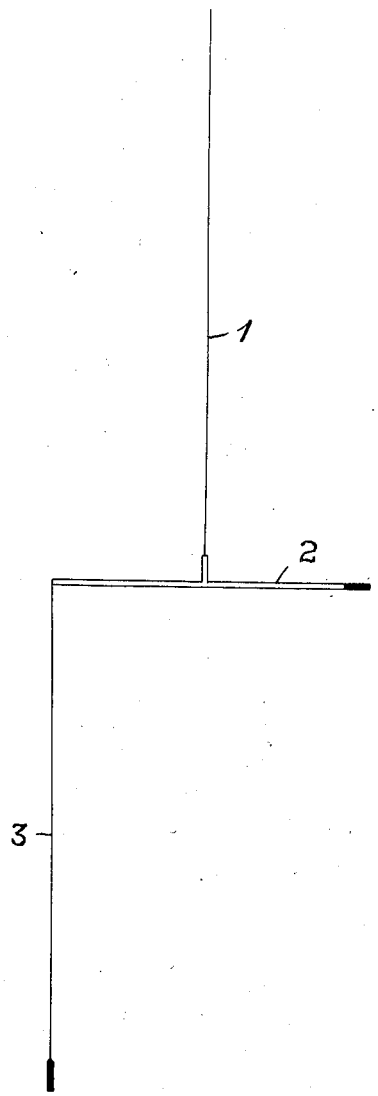

Patented Feb. 15, 1927.

UNITED STATES PATENT OFFICE.

STEPHEN RYBÁR, OF BUDAPEST, HUNGARY.

EÖTVÖS' TORSION BALANCE.

Application filed December 5, 1924, Serial No. 754,017, and in Hungary October 13, 1923. Renewed December 17, 1926.

My invention relates to certain new and useful improvements in the Eötvös' torsion-balance.

The handling of this instrument has been rendered very difficult by its vast dimensions and its great weight, and this disadvantage is accentuated by the fact that in order to make complete measurements the instrument has to be moved once or twice daily.

On the other hand, the desired sensitiveness of the instrument actually requires the same to be of great dimensions since by reducing the length of the measuring-wire, of the horizontal beam suspended from the end of the wire and of the suspension-thread of the weight hanging on one end of the beam which is the only way to reduce the dimensions of the instrument, the sensitiveness of the same also becomes reduced.

The present invention has for its object to enable the dimensions of the above mentioned three chief elements of Eötvös' torsion-balance to be considerably reduced without its sensitiveness being lessened thereby even in the smallest degree.

According to the invention this end is attained by suitable selection of the thickness and the material of the measuring-wire.

On the accompanying drawing on which the well-known pendulum of Eötvös' torsion balance is shown, 1 indicates the measuring wire, 2 the arms of the pendulum, and 3 the suspension thread of the weight.

I have discovered that by a suitable reduction of the thickness of the measuring-wire the sensitiveness of the instrument will increase to a degree much greater than the decrease of sensitiveness caused by the reduction of the weight of the pendulum which is a natural consequence due to the reduced thickness and the consequent reduced strength of the measuring-wire. When the reduction of sensitiveness due to the decreased weight of the pendulum is deducted from the increase of sensitiveness due to the reduced thickness of the measuring-wire there will still remain a certain amount of increased sensitiveness which may be utilized for reducing the length of the measuring wire and the other dimensions of the pendulum whereby, as it is well known, the sensitiveness of the instrument becomes reduced.

If the degree of sensitiveness of the instrument is indicated with E, the moment of inertia of the parts suspended by the measuring-wire with K, and the moment of torsion of the measuring-wire with $t$, there results $E = C\frac{K}{t}$ wherein C denotes a constant.

From the article by R. V. Eötvös, "Untersuchungen über gravitation und erdmagnetismus," published in Annalen der Physik und Chemie (Wiedemann) volume 1896, page 361, it appears that the horizontal directing force of the gravitation on any place of the globe.

$$R = g\left(\frac{1}{r_1} - \frac{1}{r_2}\right),$$

in which $g$ is the acceleration of the force of gravitation, $r_1$ the smallest and $r_2$ the greatest radius of curvature of the niveau surface of gravitation on that place. If the moment of inertia of the suspended parts of a torsion balance is denoted by K, the moment of torsion of the measuring-wire by $t$, then the relation between the turning angle $\delta$ of the torsion balance and the above mentioned quantities according to Eötvös is:

$$t\delta = g\left(\frac{1}{r_1} - \frac{1}{r_2}\right)K(1-e)\frac{\sin 2\alpha}{2}$$

In this equation, $e$ denotes a small negligible quantity, which depends on the adjustment of the masses of the balance and $\alpha$ the angle about which the beam has been turned with respect to the normal position of the wire.

As the quantity $$(1-e)\frac{\sin 2\alpha}{2}$$

is constant in a determined position of the beam which can be denoted by $a$ $$t\delta = R.K.a, \text{ or } \delta = a.R.\frac{K}{t}.$$

In other words, the turning angle is in direct proportion to $\frac{K}{t}$. The turning angle therefore is proportionate to the sensitiveness E and therefore $$E = C\frac{K}{t}.$$

The moment of torsion of the measuring-wire is, under otherwise similar conditions, proportionate to the fourth power of the diameter of the wire, whilst the breaking strength of the wire is proportionate to the second power of its diameter. This relation between the diameter of a wire and the moment of torsion applied to the wire will be found in text-books on physics, as, for instance, the "Handbuch der Physik" by Winkelmann, second edition, Vol. I, page 648, whereas the relation between the breaking strength of a wire and its diameter will be found, for instance, in the "Lehrbuch der praktischen Physik" by Kohlrausch, 14, edition, 1923, page 237. By reduction of the diameter of the wire to one half of the usual diameter of 0.02 mm., its moment of torsion ($2^4=16$) will be reduced to one sixteenth and its strength to one fourth of the original ones. In other words, if a wire of the same length but half as thick is taken, and the weight of the parts suspended by the measuring-wire is reduced to one fourth of the original weight leaving the relative distribution of the masses as heretofore the moment of inertia of the pendulum will be reduced to one fourth and the moment of torsion of the wire to one sixteenth of the original ones. Thus, the sensitiveness of the pendulum ($\frac{1}{4}$ divided by $\frac{1}{16}$ equals 4) will be four times as great as it was originally. If the diameter of the measuring-wire is reduced to one third of the original one, the pendulum will be, if of the same length, $$\frac{3^4}{3^2}=3^2=9$$

times as sensitive as it was originally. That is to say, the sensitiveness of the instrument is in inverse proportion to the square of the diameter of the measuring wire, if of the same length provided the mass of the pendulum is reduced in proportion to the square of the reduction of the diameter of the wire.

This greater sensitiveness can be utilized to reduce the dimensions of length of the whole pendulum, viz (1) the length of the measuring-wire, (2) the length of the beam, (3) the depth of the suspended weight, to such an extent as to obtain the desired sensitiveness which may equal that of the torsion-balances used heretofore or, if desired, may exceed it.

The moment of torsion of the wire is under otherwise similar conditions, in inverse proportion to the length of the same, while the moment of inertia of the swinging parts is proportionate to the square of the length of the beam. When these dimensions are reduced, the degree of sensitiveness is in inverse proportion to the third power of the reduction, that is to say if the diameter of the measuring-wire is so selected as to equal one fourth of the diameter heretofore used and thus the sensitiveness is increased to an amount sixteen times as great as the original one, the length of the measuring wire and that of the beam as well as the depth of the suspended weight may be divided by $$\sqrt[3]{16}=2.52$$

in order to keep the sensitiveness of an equivalent degree. In this manner, the diameter of the instrument will become two and a half times smaller when the diameter of the measuring wire is reduced so as to equal one fourth of the original diameter. To explain further, if a given twisting moment is applied to a wire of the length 1 and this twisting moment results in twisting the wire with an angle $\alpha$ then the same twisting moment will twist a wire of the same thickness and of the same material but of the length of twice 1 with an angle $2\alpha$, as every portion of the wire of the length 1 is twisted with the same angle. Thus, the torsion moment of a wire of the double length is one-half of that of the original length. The moment of inertia of the suspended parts is proportionate to the square of the length of the beam, that is to say, if the beam is of double the length, the moment of inertia of the suspended parts is four times as great.

Now, if the length of the wire is reduced to one-half, the torsion moment will be double, and if the beam is reduced to one-half, the moment of inertia will be the fourth. The degree of sensitiveness will now be $$E=C\frac{K}{t}=C\frac{4}{2}=C\frac{1}{8} \text{ or } C\frac{1}{2^3}$$

If the reduction of the length is one-third, the sensitiveness will be $$C\frac{1}{3^3},$$

in order words, the degree of sensitiveness is in inverse proportion to the third power of the reduction, or the reduction can be the cubic root of the increase in sensitiveness. If the diameter of the measuring wire is now reduced to one-fourth, the sensitiveness is increased to an amount 16 times as great, therefore the reduction of the length of the wire and of the beam may be $$\sqrt[3]{16}=2.52.$$

As a consequence the instrument will become considerably lighter, easy to transport and its handling will be infinitely cheaper.

Obviously, by a suitable selection of the material of the measuring-wire, its breaking strength will become considerably larger than that of the platinum-iridium wire heretofore used, so that the weight of the pendant may be suitably enlarged whereby the sensitiveness is further increased, that is to say, the dimensions of the instrument may be still further reduced.

Experiments made in this direction have shown that the metals of the platinum group, viz ruthenium, rhodium, palladium, osmium and irridium as well as their alloys, further metals of the tungsten group, viz molybdenum and tungsten as well as their alloys yield filaments of much more favorable properties than the platinum-iridium filaments heretofore used.

I claim:—

In a torsion balance of the Eötvös type, the combination of a torsion wire, a beam suspended from said torsion wire and a weight suspended from said beam; the diameter of said torsion wire being reduced below .02 mm. and the beam and length of wire being reduced from the size in the normal Eötvös torsion balance of 40 cm. and 50 cm. respectively by the cube root of the fourth power of the ratio between .02 mm. and the diameter of the reduced wire whereby the sensitiveness of said balance remains unchanged from said normal Eötvös balance.

In testimony whereof I have signed my name to this specification.

Dr. STEPHEN RYBÁR.